United States Patent [19]

Sticken

[11] Patent Number: 4,786,488

[45] Date of Patent: Nov. 22, 1988

[54] PROCESS FOR THE PURIFICATION OF HYDROCHLORIC ACIDS

[75] Inventor: Gerhard Sticken, Dorsten, Fed. Rep. of Germany

[73] Assignee: Chemische Werke Huls Aktiengesellschaft, Marl, Fed. Rep. of Germany

[21] Appl. No.: 710,673

[22] Filed: Mar. 12, 1985

Related U.S. Application Data

[63] Continuation of Ser. No. 466,484, Feb. 15, 1983, abandoned.

[30] Foreign Application Priority Data

Mar. 5, 1982 [DE] Fed. Rep. of Germany ....... 3207887

[51] Int. Cl.$^4$ .............................................. C01B 7/07
[52] U.S. Cl. ..................................... 423/488; 23/307; 203/91; 210/908
[58] Field of Search ............... 423/481, 488, 414, 439, 423/462, 472; 23/306, 307; 210/774, 908; 203/91

[56] References Cited

U.S. PATENT DOCUMENTS 3,597,167  8/1971  Marks et al. ..................... 23/307

FOREIGN PATENT DOCUMENTS 36999  9/1979  Japan ................................ 423/488

OTHER PUBLICATIONS

Kirk-Othmer Encyclopedia of Chemical Technology, 3rd ed., vol. 12, John Wiley & Sons, New York, 1980, pp. 999–1000.

Primary Examiner—John Doll
Assistant Examiner—Jeffrey Edwin Russel
Attorney, Agent, or Firm—Antonelli, Terry & Wands

[57] ABSTRACT

A process for the purification of hydrochloric acids contaminated with $C_1$-chlorinated hydrocarbons involves the controlled use of a distillator column. The contaminants are removed by stripping with HCl gas, the stripping being performed in a bubble column.

10 Claims, 1 Drawing Sheet

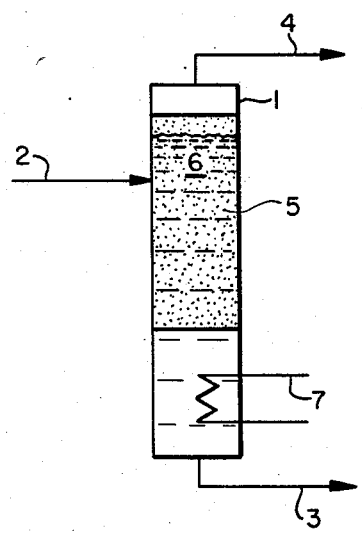

PROCESS FOR THE PURIFICATION OF HYDROCHLORIC ACIDS

This is a continuation of application Ser. No. 466,484, filed Feb. 15, 1983, now abandoned.

Organic chlorination processes conducted on a large technical scale yield large amounts of gaseous HCl which, during the course of product processing, are separated from the chlorination products as well as from any starting materials still present and are in their entirety passed on to suitable reuse.

Generally, the removal of gaseous HCl from such chlorination product streams takes place by absorption with azeotropic, i.e., about 20% by weight, hydrochloric acid with the formation of, for example, 30% by weight hydrochloric acid, from which the HCl gas can subsequently be completely recovered by distillation. The HCl absorption in non-aqueous media (for example chloroform) after separation of HCl and, for example, $C_1$-chlorinated hydrocarbons; i.e., chlorinated hydrocarbons having a single carbon atom by low-temperature condensation apparently is not very popular (*Ullmanns Encyklopadie der technischen Chemie* [*Ullmann's Encyclopedia of Technical Chemistry*] 4th edition, 1975, Vol. 6, pages 409 et seq.).

When using water as the absorption liquid, the proportion of HCl consumed until the azeotrope is attained cannot be recovered by distillation. Therefore, water is utilized as the absorption liquid only insofar as there is a need for azeotropic or subazeotropic hydrochloric acid.

During the HCl absorption in azeotropic hydrochloric acid or water, amounts, corresponding to the solution equilibrium, of the products formed during the chlorination processes as well as possibly any still present starting compounds are dissolved in the aqueous hydrochloric acid being produced. These impurities are generally troublesome in the further reuse of the hydrochloric acid, especially when HCl gas is again liberated by boiling from the hydrochloric acid, which latter is obtained, for example, in 30% by weight strength, and is to be used somewhere else, if necessary after conducting a drying step. The impurities are then present almost exclusively in the HCl gas. However, even the aqueous hydrochloric acid utilized, for example, for water processing in power plants may exhibit only a certain proportion of impurities, namely according to DIN [German Industrial Standard] 19 610, inter alia, organic chlorine compounds in a quantity of maximally 20 mg of organically bound chlorine per liter.

The aqueous hydrochloric acid thus must be freed in such cases of the chlorination products dissolved therein and of any other starting materials still present.

This can be accomplished by extraction with a suitable extractant, i.e., one which shows only sparse solubility in aqueous hydrochloric acid, as well as by "stripping", i.e., by driving out with a carrier gas. Both possibilities are, in general, conventional.

The process of this invention as will be described hereinbelow concerns the latter procedure, i.e., the purification of aqueous hydrochloric acids by stripping with gaseous HCl; in particular, the process relates to superazeotropic (above the azeotropic) hydrochloric acids (i.e. HCl content higher than about 20% by weight), from which part of the potentially releasable HCl gas can be liberated by distillation and utilized as the stripping gas. In correspondence with the known vapor pressure values of aqueous hydrochloric acids (A. Schmidt, Chem. Ing. Tech. 25 [1953]: 455 et seq.), this HCl stripping gas contains small amounts of steam.

In the present case, the purification of hydrochloric acids addresses itself concretely to the removal of $C_1$-chlorinated hydrocarbons.

Two processes have been known in the prior art for the stripping of superazeotropic, aqueous hydrochloric acids with gaseous HCl; in both cases, the stripping gas is liberated by distillation as part of the potentially obtainable amount of HCl gas by boiling the aqueous hydrochloric acid; however, neither case describes the removal of $C_1$-chlorinated hydrocarbons. The objective of the two processes is to find an advantageous treatment (working up) of the stripper overhead discharge.

The firm of Hoechst AG considers it advantageous to absorb the stripper overhead discharge in boiling water; in this procedure, no HCl losses are to be incurred, and the driven-out impurities are to be recovered in their entirety. However, according to statements made by Hoechst itself, this mode of operation leads to such complications—especially with respect to control technique—that a technical realization of the process becomes impracticable (Chem. Ing. Techn. 35 [1963]: 262 et seq.).

According to Japanese Patent Application JP-A-No. 66/54 049, the stripping of highly concentrated hydrochloric acid (for the removal of dissolved chlorinated hydrocarbons) can be accomplished advantageously if "according to the invention an ordinary distillation column (called "first column" thereafter) is equipped at the top with a second column". The hydrochloric acid to be purified is introduced at the head of the top column and flows through same concurrently with the gaseous stream coming from the lower column and likewise fed at the head of the top column. At the sump of the top column, an HCl-impurity-gas stream is withdrawn, representing the discharge for the impurities, but no disclosure is made regarding the disposition of this stream. The liquid hydrochloric acid flows from the sump of the top column at almost boiling temperature to the head of the bottom column wherein the actual stripping takes place by boiling of the sump. It cannot be seen, though, why this arrangement should be In-house investigations of the state of the art revealed that the removal of $C_1$-chlorinated hydrocarbons from aqueous hydrochloric acids by stripping with HCl gas presents considerable difficulties. A characterizing factor for the cited state of the art is that nothing is reported regarding the intentional or controlled removal of $C_1$-chlorinated hydrocarbons. The aforementioned difficulties are particularly apparent if it is desired to strip under increased pressure, if highly concentrated hydrochloric acids must be handled, and if the concentration of dissolved $C_1$-chlorinated hydrocarbons is high, all three of these instances being of importance in connection with considerations of process economy.

Under these circumstances, the amount of HCl stripping gas required for attaining a desired minimum concentration of impurities (for example of 10 ppm by weight) quickly can become so large under certain conditions that it is no longer tolerable from an economical viewpoint. The results of the series of tests set out below will convey an impression of this situation:

A distillation column made of glass and filled with 10×10 mm Berl saddles, which column has a diameter of 25 mm and a packing level of 1600 mm, is used as stripper and charged with a 30% by weight hydrochloric acid in an amount of 12 kg/h under a pressure of 1 bar. The feeding takes place at the head of the column. The feed temperature is 50° C. The sump of the column is maintained at boiling temperature (here 91°–92° C.) by means of a heat exchanger charged with thermoregulator oil. The stripped hydrochloric acid is withdrawn from the sump of the column.

The concentration of the impurities in the hydrochloric acid feed is 1200 mg of organically bound chlorine per liter. The impurities consist of $CH_3Cl$, $CH_2Cl_2$, $CHCl_3$, and $CCl_4$ in a weight ratio of 1:3:1:0.03.

In order to bring the concentration of impurities in the efflux hydrochloric acid to 10 mg of organically bound chlorine per liter, 0.3% of the amount of HCl fed to the stripper—in the form of aqueous hydrochloric acid—must be withdrawn overhead, i.e., as the stripping gas.

Thereafter, the pressure at the head of the column is raised from 1 to 4 bar (absolute) whereby the boiling point of the aqueous hydrochloric acid withdrawn in the sump of the stripper rises to about 130° C. In order to set, under these conditions, a residual concentration of impurities in the stripped hydrochloric acid of again 10 mg of organically bound chlorine per liter, it is necessary to take 1.6–1.7% of the amount of HCl, fed in total to the stripper, overhead as the stripping gas. This is about 5 to 6 times the quantity as compared with normal pressure stripping.

If at 4 bar (absolute), the HCl concentration of the hydrochloric acid feed is furthermore raised from 30 to 35% by weight, the following picture emerges:

To obtain a residual concentration of impurities in the stripped hydrochloric acid of 10 mg of organically bound chlorine per liter, it is now necessary to withdraw overhead 10–12% of the amount of HCl, fed in total to the stripper, as the stripping gas. This is 6 to 7 times the amount as compared with the 30% by weight hydrochloric acid likewise stripped at 4 bar (absolute).

Finally, the influence of the impurity concentration on the required quantity of stripping gas can be seen from the example of the prior art set forth below:

A distillation column made of glass and filled with 25×25 mm Raschig rings, which column has a diameter of 200 mm and a packing level of 3000 mm, is used as stripper and charged with a 35% by weight hydrochloric acid in an amount of 425 kg/h under a pressure of 1 bar (absolute). The feed takes place at the head of the column. The feed temperature is 20° C. The sump of the column is maintained at boiling temperature (here about 65° C.) with steam. The stripped hydrocholoric acid is removed from the sump of the column. The concentration of impurities in the hydrochloric acid feed is 1700 mg of organically bound chlorine per liter. As described above, here again the impurities consist of $CH_3Cl$, $CH_2Cl_2$, $CHCl_3$, and $CCl_4$ in a weight ratio of 1:3:1:0.03. In order to bring the concentration of impurities in the discharged hydrochloric acid to 20 mg of organically bound chlorine per liter, 0.3–0.4% of the amount of HCl fed to the stripper in the form of aqueous hydrochloric acid must be withdrawn overhead, i.e., as the stripping gas.

If the concentration of impurities in the hydrochloric acid feed is increased to 5000 mg of organically bound chlorine per liter, about 4.8% of the quantity of HCl fed to the stripper in the form of aqueous hydrochloric acid is then required as the stripping gas, i.e., about 10 to 15 times the amount, in order to obtain the aforementioned residual concentration of impurities of 20 mg of organically bound chlorine per liter.

In view of the results evolving from the processes known from the prior art, the objective poses itself of looking for a purification process permitting successful stripping even with the use of increased pressure, using greatly contaminated and highly concentrated hydrochloric acids as the feed material.

To design such a purification process maximally economically, care must furthermore be taken that the energy consumption figures are low, that the $C_1$-chlorinated hydrocarbons removed from the hydrochloric acids are extensively recovered, and that the HCl losses during purification are kept at a minimum. Furthermore, another objective is to maintain the amount of stripping gas at a minimum.

This means the following for the aqueous hydrochloric acid as the liquid to be stripped:

The energy consumption values can be kept low if the hydrochloric acid to be purified is selected to be of a maximally high concentration (specific heat and heat of evaporation drop with a rising HCl concentration; the amount of HCl processed per unit time and thus made available increases with a rising HCl concentration).

A mode of operation which is free of losses with respect to HCl and with respect to the $C_1$-chlorinated hydrocarbons can be attained if the overhead discharge of the stripper is recycled into the HCl absorption section of the chlorination process. Since the HCl absorption section is generally operated under a slightly elevated pressure, it is advantageous to effect the stripping of the hydrochloric acid feed under increased pressure, e.g., 1.5 to 4 bar (absolute).

Finally, the amount of HCl stripping gas to be liberated for purifying the aqueous hydrochloric acid is to be at a minimum. High amounts of HCl stripping gas require, on the one hand, much evaporation energy and, on the other hand, lead to a marked drop in concentraton of the aqueous hydrochloric acid, whereby the quantity of HCl gas obtainable per mass unit of hydrochloric acid decreases; this is disadvantageous from an energy viewpoint for the HCl gas recovery usually conducted after the stripping step. Besides, when recycling a large HCl stripping gas stream into the HCl absorption section of the chlorination process, the capacity of this absorption section is restricted. If no HCl stripping gas recycling is carried out, large quantities generally entail correspondingly high losses.

It has now been found surprisingly that the deficiencies in the use of the conventional methods for removing $C_1$-chlorinated hydrocarbons from aqueous hydrochloric acids by stripping with HCl gas, suitably liberated by boiling of the hydrochloric acid, are overcome by employing the process of this invention wherein this removal of impurities is conducted in a bubble column instead of in the heretofore customery distillation column.

The bubble columns can be operated without packing; however, preferably, packed bubble columns are used, i.e., bubble columns with packing elements.

Distillation-columns of a normal type of construction filled with a package of packing elements are suitable for the process of this invention, except that they are not operated—as customary heretofore—by trickling but rather are operated—in an entirely unaccustomed fashion—by flooding, i.e., as a bubble column.

Generally, the type of structure of the packing elements utilized need not meet any special requirements. Thus, it is possible to employ, for example, Raschig rings, Berl saddles, or Pall rings of a material, respectively, suited to the process.

Especially advantageous modes of operation are generally attained if the packing element diameter is 1/10 to 1/20 of the bubble column diameter, or even smaller. The lower limit of the packing element diameter is given by the flow resistance which is being built up. Bubble columns with larger packing elements generally require a larger HCl overhead discharge for obtaining a predetermined residual impurity concentration in the hydrochloric acid to be purified.

In several cases, especially when using highly concentrated, greatly contaminated hydrochloric acids, empty bubble columns in a pressure range of 4 bar (absolute) operate substantially more advantageously than the heretofore customary distillation columns.

BRIEF DESCRIPTION OF THE DRAWING

The process of the invention will be readily understood with reference to the following description and the accompanying drawing wherein the sole figure shows a schematic illustration of a packed bubble column suitable for conducting the process of this invention.

The bubble column consists of a normal column (1) filled with packing materials (5) and combined with an evaporator at the bottom (7) to evaporate the HCl stripping gas. The hydrochloric acid to be stripped enters the upper part of the packed bed (2) and leaves the column at the bottom through the sump (3). The impurities to be removed by stripping leave the bubble column, that is, the stripper, overhead (4). The liquid level in the stripper is to be held at little below the upper limit of the packed bed (6); the packed bed remaining in the gas phase serves as protective device for spray liquid.

It has been found surprisingly that stripping of the aqueous hydrochloric acid contaminated with $C_1$-chlorinated hydrocarbons in bubble columns is comparatively insensitive to the pressure; whereas with the use of distillation columns, even minor increases in pressure result in very extensive increases in the amount of HCl stripping gas required in order to attain a predetermined purification goal; this can be seen directly from the aforedescribed experiments in connection with the state of the art.

The process of this invention permits stripping under normal pressure as well as increased pressure, practically without any impairment of the stripping result. The selection of the pressure depends on the respectively intended further processing of the stripper overhead discharge. In general, it will be desirable to feed this stream to an already existing working-up section of the respective process, for which pressures of up to about 4 bar (absolute) are necessary. According to the results presently obtained, no grave impairment of the stripping process at higher operating pressures needs to be expected.

Stripping even under increased pressure, as can now be carried out with the use of the process of this invention, makes it possible in a simple way to conduct the advantageous, direct recycling of the impurity-loaded HCl overhead discharge into the HCl absorption section of the chlorination process. In general, HCl absorption plants are operated under a slightly elevated pressure (for example 3 bar [absolute]). Thus, for the aforementioned recycling step, a pressure at the head of the stripper is sufficient which is slightly higher, i.e., for example 4 bar (absolute). Investigations in connection with the process of this invention showed advantageous operation in this range, as borne out by the examples.

The advantage of the process according to this invention becomes particularly apparent in the areas where stripping heretofore could be accomplished only with large amounts of HCl gas or was even no longer practicable at all. This refers especially to stripping processes involving highly concentrated, greatly contaminated hydrochloric acids under elevated pressure.

The process of this invention operates very advantageously even in normal pressure stripping of greatly contaminated, highly concentrated hydrochloric acids, as can be seen directly from Example 1 set forth below.

The process of the present invention furthermore facilitates handling of high-concentration hydrochloric acids. Thus, for example, the boiling point of a 40% by weight hydrochloric acid under normal pressure is, at about 33° C., already impracticably low, while at 4 bar (absolute), it is of about 67° C., definitely within the range of a practicable mode of operation. A hydrochloric acid of 40% by weight occurs in the stripper already with a 35% by weight hydrochloric acid feed.

The following examples will explain the process of this invention.

EXAMPLE 1

A glass column filled with 25×25 mm Raschig rings and having a diameter of 200 mm and a packing level of 3000 mm is charged under a pressure of 1 bar (absolute) with 425 kg/h of a 35% by weight hydrochloric acid. Feeding takes place at the head of the column. The feed temperature is 20° C. The column is operated in trickling mode, as customary heretofore.

The sump of the stripper is maintained at boiling temperature, i.e., about 65° C., by means of a heat exchanger charged with low-pressure steam. The stripped hydrochloric acid is withdrawn from the sump of the stripper. The impurity concentration of the hydrochloric acid to be stripped lies at 5000 mg of organically bound chlorine per liter. The impurities involved are exclusively $C_1$-chlorinated hydrocarbons of the following composition: $CH_3Cl:CH_2Cl_2:CHCl_3:CCl_4=1:3:1:0.03$ parts by weight.

In order to bring the residual concentration of the impurities in the efflux hydrochloric acid to 20 mg of organically bound chlorine per liter, about 4.8% of the quantity of HCl fed to the stripper in the form of aqueous hydrochloric acid must be withdrawn overhead, i.e., as the stripping gas.

Thereafter, the column is operated, under otherwise identical conditions, in the flooded state, i.e., as a filled bubble column. To obtain the same residual content of impurities of 20 mg of organically bound chlorine per liter, only 1.5% of the amount of HCl fed to the stripper needs to be withdrawn overhead as the stripping gas.

EXAMPLE 2

A glass column filled with 4×4 mm Raschig rings and having a diameter of 100 mm and a packing level of 3000 mm is used as stripper and charged under a pressure of 1 bar (absolute) with 45 kg/h of a 35% by weight hydrochloric acid. Feeding takes place at the head of the column. The feed temperature is 20° C. The column is operated in the trickling mode, as customary heretofore.

The sump of the stripper is maintained at boiling temperature, i.e., about 65° C., by means of a heat exchanger charged with thermoregulator oil.

The stripped acid is withdrawn from the sump of the column. The concentration of the impurities in the hydrochloric acid to be stripped is 1200 mg of organically bound chlorine per liter. Chlorinated $C_1$-hydrocarbons are involved a impurities as in Example 1.

To obtain under these conditions a residual concentration of impurities in the stripped acid of 10 mg of organically bound chlorine per liter, about 2–3% of the amount of HCl fed in total to the stripper must be withdrawn overhead as the stripping gas.

Thereafter, the column is operated, under otherwise identical conditions, in the flooded state, i.e., as a filled bubble column. To obtain the same residual impurity content of 10 mg of organically bound chlorine per liter, only about 1% of the HCl quantity fed to the stripper need be withdrawn overhead as the stripping gas in this case.

EXAMPLE 3

The arrangement of Example 2 is operated, instead of at 1 bar (absolute), at 4 bar (absolute). The sump temperature of the column thus rises to about 100° C.

In the trickled-column condition, about 10% of the HCl quantity fed to the stripper must be withdrawn as the stripping gas to obtain a residual concentration of impurities of 10 mg of organically bound chlorine per liter; in the flooded-column condition, the value is only about 1%, as under normal pressure.

The HCl stripping gas stream loaded with $C_1$-chlorinated hydrocarbons, which leaves the column overhead under the aforementioned pressure of 4 bar (absolute), is advantageously recycled directly into the HCl absorber of a methane chlorination stage, operated under 3 bar (absolute).

EXAMPLE 4

A glass column filled with 4×4 mm Raschig rings and having a diameter of 50 mm and a packing level of 2000 mm is used as stripper and charged under a pressure of 4 bar (absolute) with 13 kg/h of a 35% by weight hydrochloric acid. Feeding is effected at the head of the column. The feed temperature is 50° C.

The sump of the column is maintained at boiling temperature, about 100° C., by means of a heat exchanger charged with thermoregulator oil. The stripped acid is withdrawn from the sump of the column. Heating is adjusted so that 2.8–3.0% of the amount of HCl fed to the stripper are removed overhead as the stripping gas.

In the acid to be stripped, $C_1$-chlorinated hydrocarbons of the aforementioned composition are dissolved in a concentration of 3000 mg of organically bound chlorine per liter.

When operating the stripper in the trickled mode, an impurity concentration can be obtained in the stripped acid of 110 mg of organically bound chlorine per liter; in the flooded state, corresponding to a filled bubble column, this value is 25 mg of organically bound chlorine per liter.

EXAMPLE 5

A glass column filled with 25×25 mm Raschig rings and having a diameter of 200 mm and a packing level of 3000 mm is used as stripper and charged under a pressure of 1 bar (absolute) with 180 kg/h of a 35% by weight hydrochloric acid. Feeding takes place at the head of the column. The feed temperature is 20° C. The column is flooded, i.e., operated as a filled bubble column.

The sump of the column is maintained with low-pressure steam at the boiling temperature, about 65° C. The stripped acid is withdrawn from the sump of the column. Heating is adjusted so that 0.6% of the amount of HCl fed to the stripper is discharged overhead as the stripping gas.

In the acid to b stripped, 1200 mg of organically bound chlorine per liter is present in solution. The aforementioned $C_1$-chlorinated hydrocarbons are involved.

Under the above-described operating conditions, a residual concentration of impurities is obtained in the stripped hydrochloric acid of 70 mg of organically bound chlorine per liter.

If smaller Raschig rings are used as the packing, namely those having the dimensions 15×15 mm, with the other conditions remaining the same, a residual impurity concentration is obtained of 30 mg of organically bound chlorine per liter.

EXAMPLE 6

A glass column having a diameter of 50 mm is provided with a packing of 1000 mm consisting of glass coils (12×12 mm) and charged with 13 kg/h of a 35% by weight hydrochloric acid under a pressure of 4 bar (absolute). The feeding takes place at the head of the column, the feeding temperature is 50° C. The hydrochloric acid contains the aforementioned impurities in a concentration of 1500 mg of organically bound chlorine per liter in solution.

The sump of the system is maintained at boiling temperature, about 100° C., by means of a heat exchanger charged with thermoregulator oil. Heating is adjusted so that, besides, 3% of the fed amount of HCl can be withdrawn overhead.

If such a stripper—as customary heretofore—is operated in the trickling mode, a residual concentration of impurities in the hydrochloric acid dischargedfrbm the sump is obtained of about 120 mg of organically bound chlorine per liter. If the packing is removed and the column is operated instead as an empty bubble column, approximately 80 mg of organically bound chlorine per liter is the result, under otherwise identical conditions.

What is claimed is:

1. A process for the purification of hydrochloric acid which is contaminated by chlorinated hydrocarbons containing a single carbon atom by stripping with HCl gas, characterized in that the stripping is conducted in a column operating as a bubble column; the column being flooded with the hydrochloric acid and the HCl gas for stripping the chlorinated hydrocarbons being generated by heating the hydrochloric acid to a boiling temperature in the sump of the column, said HCl stripping gas passing upwardly through the bubble column before exiting as overhead together with the chlorinated hydrocarbons.

2. A process according to claim 1, characterized in that the bubble column is filled with packing elements.

3. A process according to claim 2, characterized in that the diameter of the packing elements is 1/10 to 1/20 of the bubble column diameter.

4. A process according to claim 1, characterized in that the HCl stripping gas stream, loaded with the chlorinated hydrocarbons, leaving the column overhead is recycled directly into a suitable processing stage of the process.

5. A process according to claim 1, characterized in that the bubble column is operated under a pressure of 1-4 bar (absolute).

6. A process according to claim 2, characterized in that the bubble column is operated under a pressure of 1-4 bar (absolute).

7. A process according to claim 3, characterized in that the bubble column is operated under a pressure of 1-4 bar (absolute).

8. A process according to claim 5, characterized in that a hydrochloric acid feed contaminated with the chlorinated hydrocarbons is introduced into the head of the column, the column is flooded with the hydrochloric acid feed to provide a liquid level therein, stripped hydrochloric acid having a content of chlorinated hydrocarbons that is substantially less than that in the hydrochloric acid feed is removed from a sump of the column, and the stripping HCl gas containing the chlorinated hydrocarbons is withdrawn as overhead from said column.

9. A process according to claim 8, characterized in that the hydrochloric acid feed is introduced into the column below the liquid level of the hydrochloric acid within the column and said liquid level is below the level of the packing elements.

10. A process according to claim 1, wherein the HCl gas for stripping the chlorinated hydrocarbons is passed as bubbles through the liquid hydrochloric acid which is flooded within said column to a predetermined liquid level; said hydrochloric acid contaminated by said chlorinated hydrocarbons being introduced into said column below said liquid level and the amount of HCl stripping gas being removed as overhead being less than when the column is operating in a trickling mode.

* * * * *